UNITED STATES PATENT OFFICE.

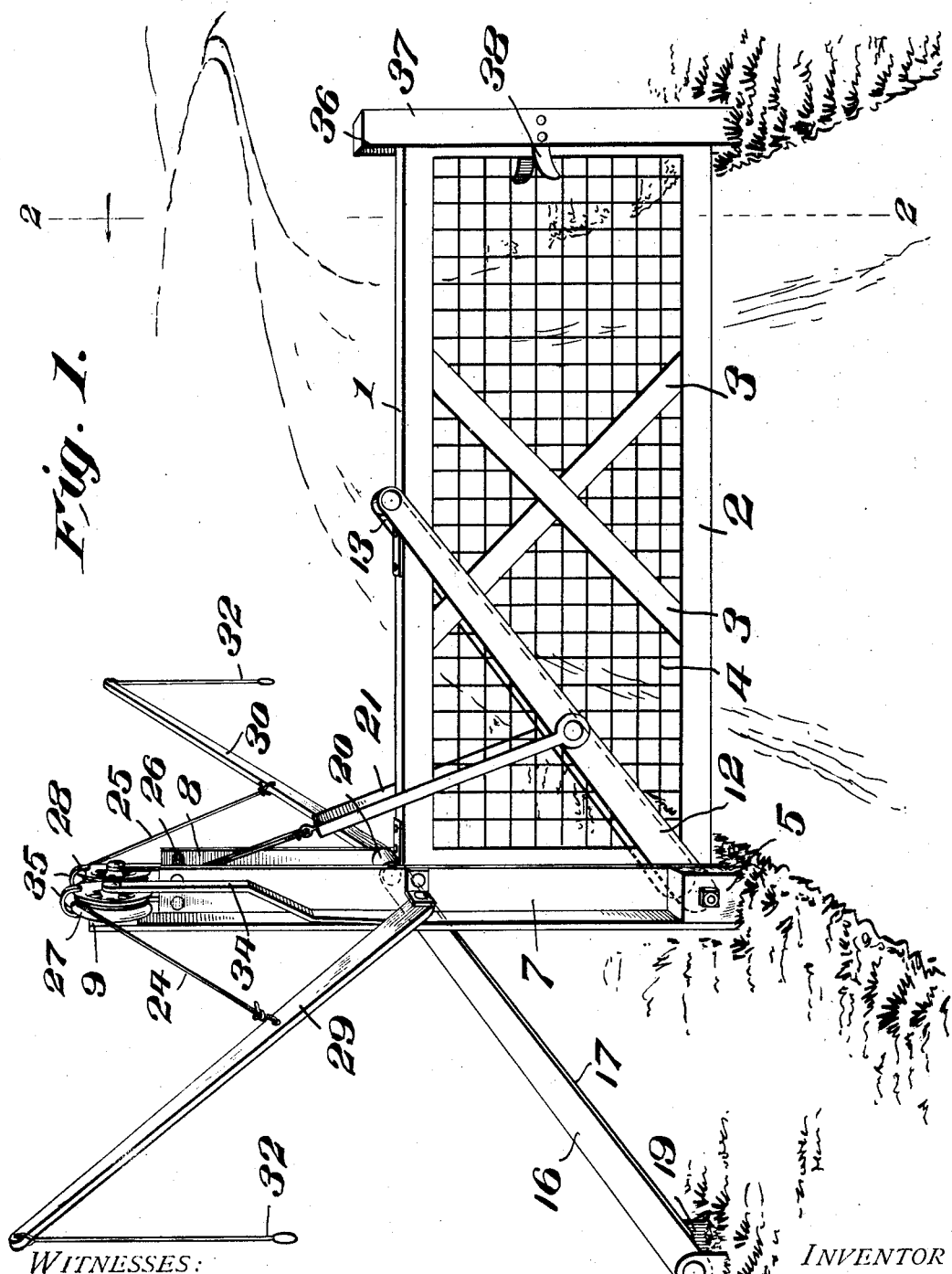

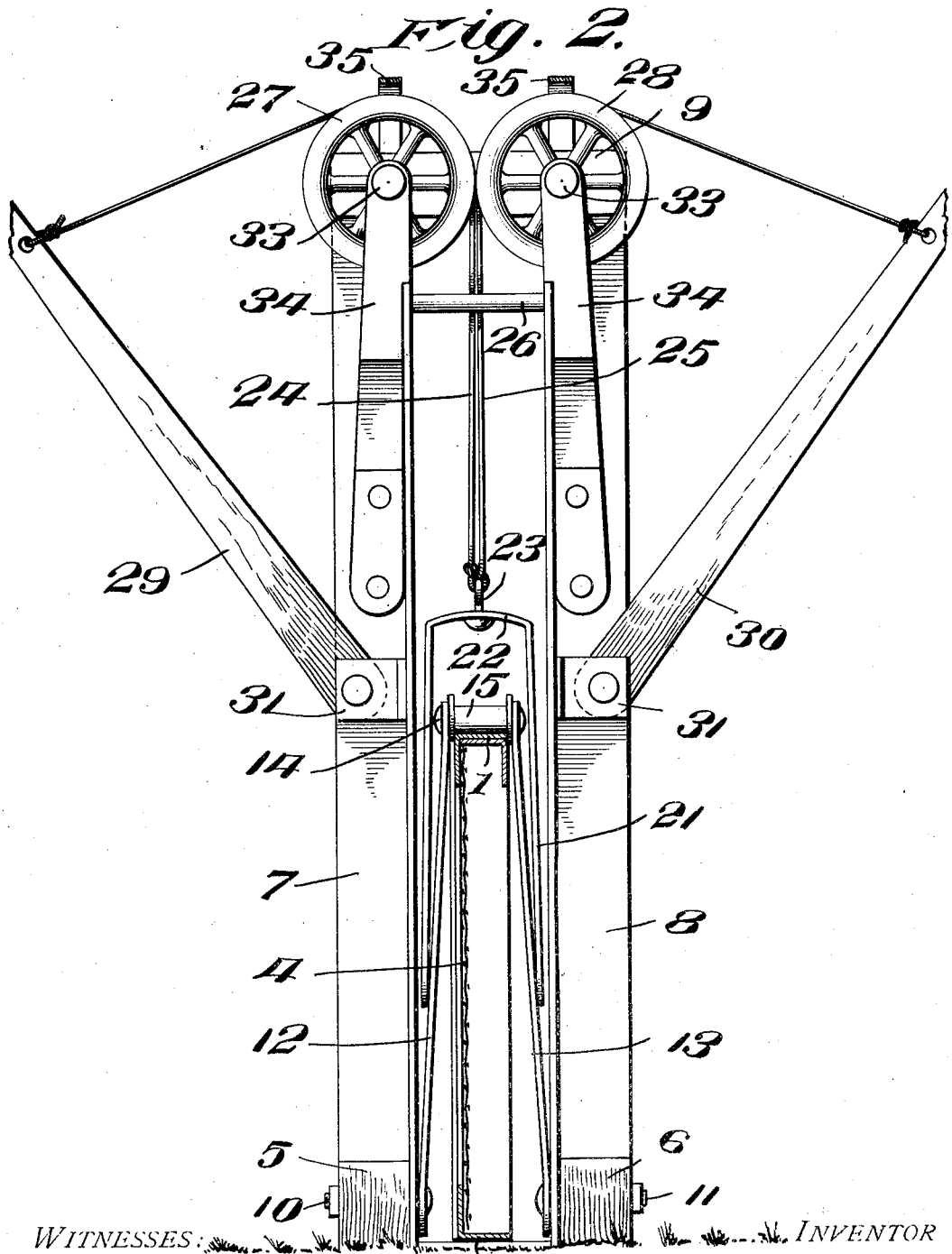

JACOB O. MARKS, OF KINGMAN, INDIANA.

HAND-OPERATING GATE.

No. 896,648.  Specification of Letters Patent.  Patented Aug. 18, 1908.

Application filed April 17, 1907. Serial No. 368,684.

*To all whom it may concern:*

Be it known that I, JACOB O. MARKS, a citizen of the United States, residing at Kingman, in the county of Fountain and State of Indiana, have invented certain new and useful Improvements in Hand-Operating Gates; and I do hereby declare the following to be a full, clear, and exact description of the invention, such as will enable others skilled in the art to which it appertains to make and use the same.

My invention relates to new and useful improvements in gates and more particularly to that class known as farm gates, and my object is to provide means for readily opening or closing the gate.

A further object is to extend operating means a distance from each side of the gate and arrange the same so that the gate may be operated from a vehicle or other conveyance.

A further object is to provide means for holding the gate against lateral or swinging movement.

Other objects and advantages will be hereinafter referred to and more particularly pointed out in the claims.

In the accompanying drawings which are made a part of this application Figure 1 is a perspective view of my improved gate and operating mechanism therefor and Fig. 2 is a sectional view as seen from line 2—2 Fig. 1, the operating mechanism being shown in elevation.

Referring to the drawings in which similar reference numerals designate corresponding parts throughout the several views 1 indicates a gate which may be of the usual or any preferred form, and in this instance I have shown the gate as consisting of a frame 2 having suitable brace arms 3 and for forming the body of the gate I have shown the usual form of woven wire 4. The gate is adapted to extend across a driveway, and in order to readily open or close the gate, I have provided means for bodily elevating the gate and moving the same longitudinally to open and close the same, and to this end I provide anchor posts 5 and 6, which are seated in the ground, and spaced a distance apart so that the gate can freely pass between the anchor posts. Secured to the anchor posts and extending upwardly therefrom are auxiliary posts 7 and 8 respectively which are preferably formed of angle iron, though they may be constructed of any other suitable material.

The auxiliary posts are secured together at their upper ends by means of a plate 9 so that said auxiliary posts will be substantially rigid throughout their length. Extending through the posts 5 and 6 are bolts 10 and 11 respectively, upon the inner ends of which are pivotally mounted arms 12 and 13 said arms extending at each side of the gate and to the upper edge thereof and secured to the upper rail of the frame 2 by passing a pin 14 through the upper ends of the arms and through a bearing 15 secured to the upper rail of the frame 2, said bearing being located on the frame at a point slightly in the rear of the longitudinal center of the gate, thereby directing the arms at an angle to the horizontal when the gate is in its open or closed position.

In order to hold the gate from tilting when being swung to its open or closed position I provide a pair of auxiliary arms 16 and 17 the lower ends of which are pivotally secured to auxiliary anchor posts 18 and 19 respectively, which are located at the proper distance in the rear of posts 5 and 6, while the upper ends of said auxiliary arms are pivotally secured to a bearing 20 on the upper portion of the rear end of the gate, said auxiliary arms being at the same angle as the arms 12 and 13 so that said arms will operate in unison.

In order to readily and easily elevate the gate and move the same longitudinally, I secure to the arms 12 and 13, and at a point adjacent their longitudinal center, a clevis 21 to the connecting bar 22 of which is secured an eye 23, said eye in turn receiving one end of a pair of cables 24 and 25, said cables passing between a pair of guide rollers 26 which are rotatably mounted between the upper ends of the auxiliary posts 7 and 8.

The cables 24 and 25 after passing between the guide rollers 26 are extended over sheaves 27 and 28 respectively, said sheaves being provided with circumferential grooves in which the cables rest, and as the sheaves are mounted respectively upon the auxiliary posts 7 and 8 and the cables passed between the meeting edges of the sheaves, the outer ends of said cables will be extended in opposite directions and one at each side of the gate, and in order to readily operate the cables, I provide levers 29 and 30, the cable 24 being secured to the lever 29 while the cable 25 is secured to the lever 30.

The levers 29 and 30 extend upwardly and outwardly, and their lower ends are pivotally secured to brackets 31 on the auxiliary posts 7 and 8 and the free ends of the levers are provided with pull rods 32, said rods extending downwardly from the levers and in position to be reached by the operator when in a vehicle or upon terra firma.

The sheaves 27 and 28 are rotatably mounted upon the axles 33, the inner ends of which are fixed to the plate 9 while the outer ends thereof are supported by means of brackets 34, and in order to prevent the cable from casual displacement from the sheaves the cables are directed once around the sheaves, and guards 35 are provided and extended upwardly from the plate 9 and curved over the upper edge of the sheaves so that that portion of the cables extending between the sheaves and levers will be positively guided into the circumferential grooves while that portion of the cables between the sheaves and clevis is held in alinement with the grooves by means of the guide rollers 26, and also by so locating the sheaves that their peripheral edges will substantially contact each other. It will now be seen that, when it is desired to open the gate, by giving a downward pull upon either of the pull rods 32 the gate will be elevated and swung rearward between the auxiliary posts, and by giving the pull rod a sharp pull to direct the gate beyond the center of gravity, said gate will be removed from over the driveway and located in the rear of the auxiliary posts, and it will likewise be seen that a similar pull upon either of the pull rods will close the gate.

After the gate has been closed the forward end thereof is held against lateral movement by being directed into a cavity 36 in a keeper post 37, and in order to positively guide the forward end of the gate into the cavity, I secure to the keeper post a pair of curved fingers 38 one at each side of the cavity so that as the gate is moving forwardly across the driveway, the forward end of the gate will enter between said fingers, and be positively guided into the cavity 36.

It will now be seen that I have provided a very cheap and economical means for opening and closing the gate and one that can be readily installed and used in connection with any preferred form of gate.

What I claim is

A gate of the character described, comprising uprights right angled in cross section arranged at its rear end, parallel swinging bars having their upper ends pivotally connected to a point slightly above the gate, a bearing or bracket secured to the gate topbar, a pin passed through an upper-end eye formation of said bracket or bearing and through the corresponding ends of said swinging bars, additional parallel swinging bars fulcrumed distantly beyond the rear end of said gate and having their upper ends also extending slightly above the gate and in like manner connected thereto at that end, right-angled lug-plates connected to said uprights, gate actuating levers pivoted to said right-angled lug-plates, rotary bearings journaled in the upper ends of said uprights, with their grooved peripheries closely opposed to each other forming practically thereby a guide-passage, a yoke or bail-like member pivoted to the first referred to swinging bars, lines or cables connected to said yoke or bail-like member and passed over said rotary bearings and through said guide-passage and connected to said gate manipulating levers.

In testimony whereof I have signed ny name to this specification in the presence of two subscribing witnesses.

JACOB O. MARKS.

Witnesses:
   J. T. CARTER,
   JOS. C. SANDERS.